Aug. 20, 1940.    A. C. PETERSON    2,212,167

PRESSURE INJECTION AND DRIVING INTERNAL COMBUSTION ENGINE

Filed Feb. 26, 1937    3 Sheets-Sheet 1

Patented Aug. 20, 1940

2,212,167

UNITED STATES PATENT OFFICE 2,212,167

PRESSURE INJECTION AND DRIVING INTERNAL COMBUSTION ENGINE

Adolphe C. Peterson, Minneapolis, Minn.

Application February 26, 1937, Serial No. 127,920

25 Claims. (Cl. 60—16)

My invention relates to internal combustion engines and particularly to a form of such engines which combines especial features of pressure injection and also especial features of driving wherefore it is called pressure injection and driving internal combustion engine.

The principal objects of my invention are to provide a form of engine which shall have advantages which are not found in the commonly used type of internal combustion engine and which combines certain advantages of other types of engines so as to produce an uncommon effect and efficiency both in the use of fuel and the utilization of the heat derived from fuel to the driving of a driven element. The object is especially to provide such a system for use in the driving of automobiles and busses and railcars or railroad trains and trucks, or for any uses where an especially flexible delivery of power to a driven element is required. An object is especially to provide for any types of engine for any use whether stationary or automotive, a means of providing for a constant generation of fuel gas under pressure or vaporized fuel under pressure for the injection to the cylinders of an internal combustion engine. An object is to provide a form of fluid vapour generation for the provision of additional fluid pressure in the cylinders of an internal combustion engine beyond that ordinarily provided by the cylinders of an internal combustion engine. An object is to provide for a combined utilization of valve means for the delivery of different forms of vaporized or gaseous fluids to the cylinders of an engine. In general the object is to provide an improved form of engine especially for the driving of automotive vehicles, whether of the light or the heavy type for road or rail.

The principal devices and combinations of devices comprising my invention are as hereinafter described and as defined in the claims.

In the accompanying drawings which illustrate my invention like characters refer to like parts throughout the several views.

Referrings to the drawings:

Figure 6 is a diagram illustrating the cycle of operation with respect to any one cylinder.

Figures 3, 7 and 8 are views reduced in scale to approximately one-half that of the views in Figs. 1, 2, 4; and in these reduced views, Fig. 8 shows a side view of the device. Figures 3, 7, and 8 are necessarily as to the smaller elements of the device somewhat diagrammatic.

Referring again to the drawings, the numeral 1 indicates a crank case, 2 a crank shaft, 3 a cylinder block on one side of the crank case, 4 a cylinder block on the other side of the crank case, 5 pistons in either cylinder block, 6 connecting rods for the pistons, 7 air inlet ports in the side walls of the cylinders uncovered and covered by the pistons in reciprocation, 8 a blower blowing air from atmosphere to the air inlet ports 7 by means of manifold 9, 10 an electric motor or other means driving the air blower 8, 11 exhaust ports in the side walls of the cylinders uncovered and covered by the pistons and delivering to exhaust conduits 12. The cylinder blocks 3 and 4 each contain, as shown, four cylinders and these blocks are attached to opposite sides of the crank case 1 and the axes of the cylinders lie horizontally, so that the pistons of the cylinders reciprocate horizontally. The connecting rods 6 are attached in pairs, one of each cylinder block in a pair, on single cranks 13 of the crank shaft, as shown.

The above brief description shows an internal combustion engine of the two cycle type (illustrated principally in Figure 1) in which the cylinders are each scavenged by air blown through the air inlet ports 7 as each is uncovered by its related piston and the exhaust gases are blown from the cylinders at the same time through the exhaust gas manifold. The cylinders may be constructed to operate on high compression and compression ignition or they may be constructed to operate on the spark ignition or other type of ignition.

Each cylinder of each cylinder block 3 or 4 has formed in it approximately in the axial center of the cylinder a small valve piston cylinder 14 in each of which there is a valve piston 15 to which is connected an individual injection or small poppet valve 16 adapted to open outwardly from the cylinder combustion space A and controlling its related injection port 17. These ports 17 one for each cylinder are relatively large as compared with the ports ordinarily used for injection of fuel. Each cylinder block has in its head long rather small bores cylindrical in shape, one of which is extended along the cylinder heads on one side of the valve piston cylinders 14 and the other of which is extended along the cylinder heads on the other side of the valve piston cylinders 14, and each is as closely adjacent to the valve piston cylinders as may be made. Each bore has one port 18 or 19, respectively, delivering from the bore to the portion of the valve piston cylinder 14 within or on the under side of piston 15 that is between the piston and the port 17 so that any pressure of fluid from the bores is effective on the inner side of the valve piston 15. (See Figures 1 and 4.)

Each bore as described in the cylinder heads has one rotatable cylindrical valve in it, a vaporized fuel valve 20 (one for each cylinder block) and a steam pressure valve 21 (one for each cylinder block) and these valves, a total of four, two for each cylinder block, are driven uniformly with the speed of the crank shaft 2 by means of worm wheels 22, worms 23, shafts 24, small mitre gears 25, and the large mitre gear 26. The gears described are so formed and of such relative size that they will procure the relative speeds stated, that is one revolution of each valve for each revolution of the crank shaft 2. Each vaporized fuel valve 20 has one relatively short port 27 for each valve piston chamber or cylinder 14 and the steam pressure valve 21 has one port 28 of somewhat larger length circumferentially for each valve piston chamber 14, so that each revolvable valve thus delivers once to each valve piston chamber 14 (if the delivery is permitted) for each revolution of the crank shaft 2. (See Figures 1, 4, 3, 8.)

The ports from the vaporized fuel valves 20 are so stationed or timed that the injection of fuel will occur substantially at the period of maximum compression or near that time for its cylinder, and the ports from the steam pressure valves 21 are so stationed or timed that the delivery (if permitted) will occur for each cylinder, that is for the related cylinder, at a period of say 30 to 60 degrees (as may be determined for construction) which period will be a period beginning slightly after the period of fuel injection from the vaporized fuel valve 20, and ending preferably at a period which is the moment when the related piston 5 has completed say one-half or two-thirds of its working stroke, depending on the construction as may be determined. (See Figure 6).

Each valve piston 15 has associated with it a small spring 29 which yieldably presses its valve piston 15 and injection or poppet valve against its port 17 at periods when it is not moved away therefrom by pressure of fluid in the inner side of the valve piston chamber 14, and thus this movement is determined by the admission of fluids from the valves 20 or 21. The pressure of these springs 29 must be sufficient to keep the valves against ports 17 closed normally but not such excessive pressures as to prevent opening at the pressures contemplated to be used for delivery to the valves 20 and 21. A small port 30 in the head of each valve piston chamber 14 prevents accumulation of fluid pressure on the outward side of the valve piston 15. (See Figure 1).

The steam pressure valves 21 and the vaporized fuel valves 20 are each open at one end as shown to small chambers 31 and 32 respectively, formed in the end of the valve bores and to these chambers conduits 33, one for each vaporized fuel valve deliver, and conduits 34, one for each steam pressure valve 21 deliver. (See Figures 4, 7, 8, 3). The delivery to the vaporized fuel valves is controlled by a hand valve 35 (see Figures 2, 3, 7), and is from the vaporized fuel pressure generating means hereinafter described, and the delivery to the steam pressure valves 21 is controlled by a hand valve 36 (see Figures 3, 7, 8, 2), and is from the steam pressure generating means hereinafter described. The delivery from either pressure creating system may be thus independently controlled. The cyclic and periodic admission from the delivery systems to any cylinder of either cylinder block 3 or 4 will be controlled by the valves 20 and 21 so that always in any cylinder cycle delivery from the vaporized fuel valves 20 occurs at or near the moment of maximum compression in the specific cylinder and there is then immediately following a brief period during which combustion is permitted to continue and thereupon, if the hand valve 36 is open, delivery from the steam pressure valve 21, related, will occur to the specific cylinder during the predetermined period of revolution, say from 30 to 60 degrees, as the construction may be, and by this delivery pressure in the cylinder is maintained during this additional period.

The pressure generating systems have as their main element to maintain pressure a boiler or steam pressure container and generator which is superimposed upon the horizontally disposed engine (as described) and consists of a steel or other rectangular casing 37 (see Figs. 1, 2, 3, 7, 8), and has welded into it from end to end, welded in the boiler casing heads, flues or tubes 40a and 40b which are relatively long and cylindrical and relatively small in diameter some being flattened, but large enough in total cross sectional area to permit the easy passage of the combustion gases from either source as hereinafter described.

Figures 1, 5:
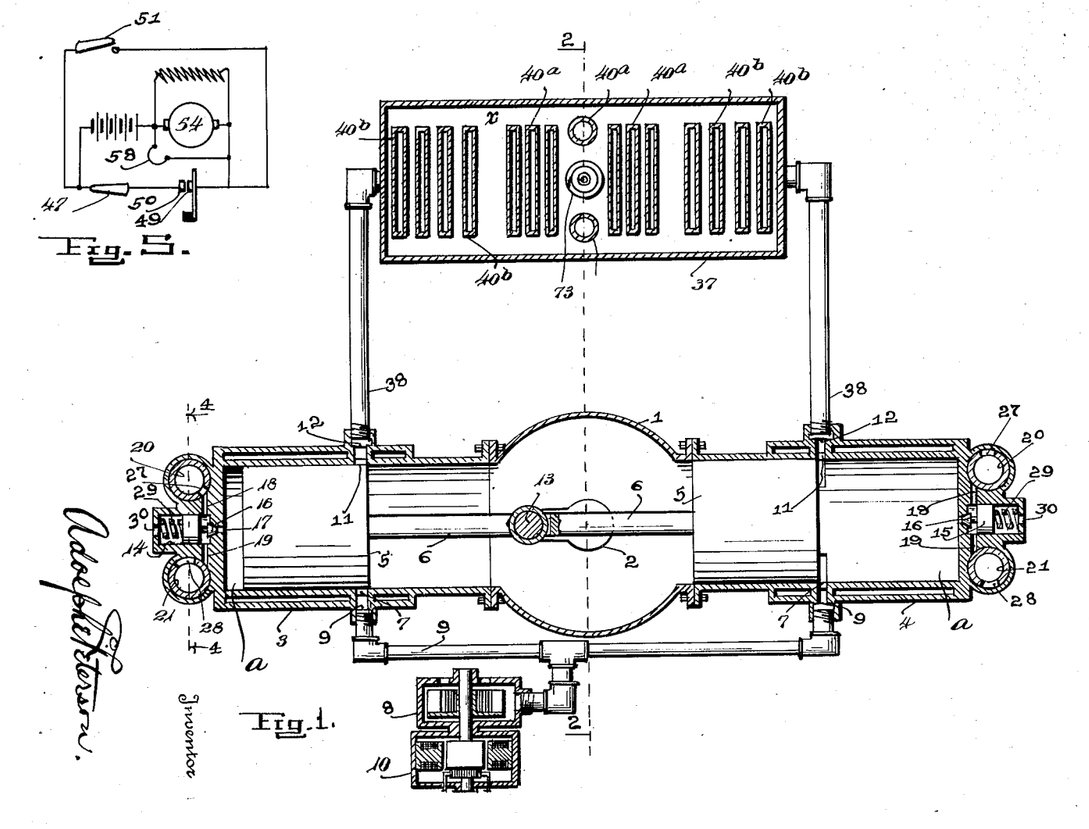
Figure 1 is a view chiefly in vertical cross section at right angles to the axis of the engine crank shaft and passing vertically through the principal elements of my device, this section being on the lines 1—1 of Figures 2, 3, 4, and 8.
Figure 5 is a diagram illustrating the electrical control circuit.
Figure 1:
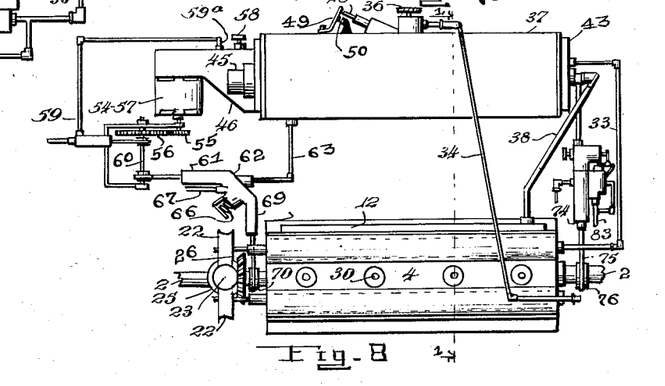
Figures 2, 4, 5:
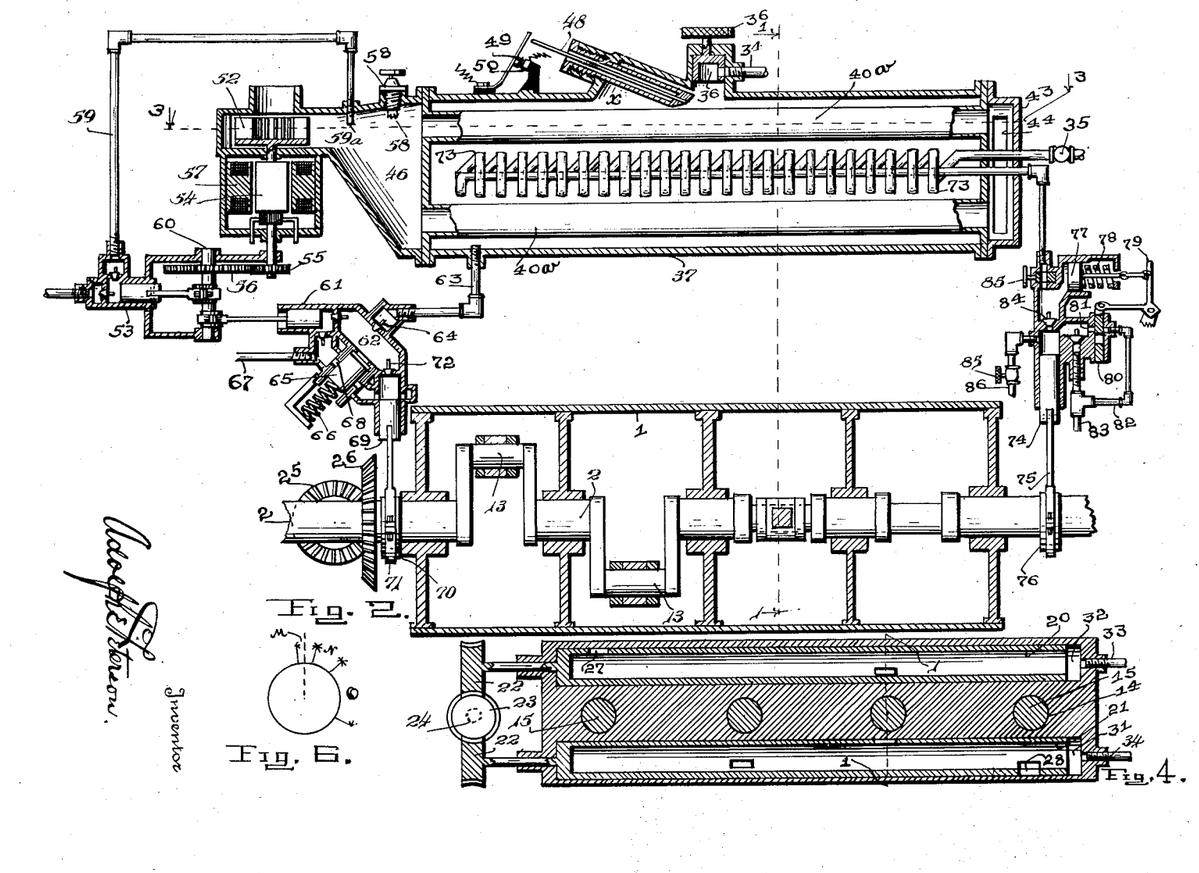
Figure 2 is a view chiefly in vertical cross section on a plane passing vertically through the axis of the crank shaft of my engine, and vertically through the principal elements of the generating means, this section being on the lines 2—2 of Figures 1, 3, 7, some parts being shown in full side elevation, the parts 8, 9, and 10 being omitted in this view.
Figure 4 is a vertical cross section on the line 4—4 of Figure 1 taken through the valve means of one cylinder block. (A section through the valve means of the other cylinder block would be substantially similar.)
Figure 3:
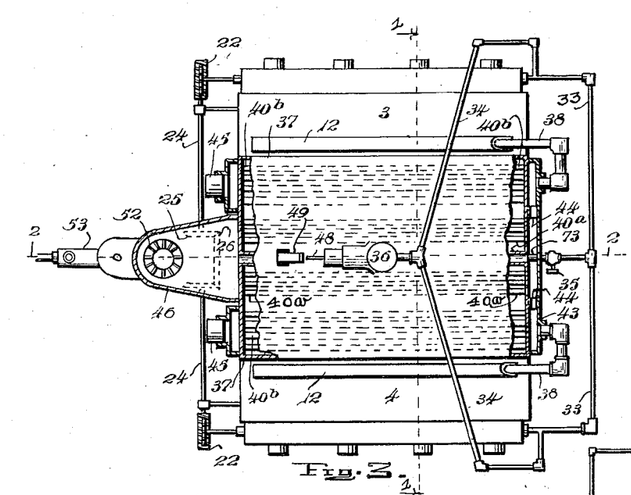
Fig. 3 shows a plan view of the device some parts in horizontal section on line 3—3 of Fig. 2.

The steam generating space of the boiler casing 37, this space being denoted X, has two methods of heat supply, one of which is the exhaust gas of the engine cylinders, and the other of which is an independent supply of heat by combustion which is initiated whenever the first mentioned supply is not sufficient to maintain sufficient heat in space X. (Figures 1 and 2.) The first supply of heat is by means of the exhaust manifold or conduits 12 which are permanently connected by means of pipes 38 to header or cap 43 having the exhaust passages 44, which connect conduit 12 of either cylinder block 3 or 4 with the one end of the flues of the boiler casing. Thus cylinder blocks 3 and 4 may deliver their exhaust gases to the header 43 and therefrom the exhaust gases may have free passage through the flues 40b of the boiler casing to the atmosphere the exhaust to atmosphere being by means of the openings or outlet pipes 45. This passage for the exhaust gases from the cylinder blocks 3 and 4 is always clear and free. (See Figures 1, 3, 7, 8.)

The end of the flues 40b of the boiler casing (that end which receives the engine exhaust gases) is also open to and receives gases of combustion freely (whenever such combustion occurs) by means of the passages 44 (see Figures 2, 3, 7) from the flues 40a of the boiler casing, and this passage is always open and clear so that it may never be obstructed. That is, passage of gases from either the cylinder blocks 3 and 4 or from the flues 40a may occur or gases from both at once may pass through the flues 40b to the atmosphere by means of the outlet pipes 45.

The opposite ends of the flues 40a are open to a combustion chamber 46. This combustion chamber is supplied with air and fuel for combustion, subject to two controls, the hand switch 47 and the thermo-regulator 48. The thermo-regulator 48 is so adjusted in relation to the spring contact 49 and contact 50, that these contacts will be closed whenever the temperature of the steam in the boiler casing is under a predetermined minimum heat, which heat should not be less than the heat required to maintain enough heat to create the fuel vaporization (as hereinafter described) but should preferably be no more than or less than the heat which may normally be supplied to the steam or water in the boiler casing when the engine cylinders are under their normal operation, as internal combustion engine cylinders. Assuming the normal heat of the exhaust gases from the manifold 12 is say eight hundred degrees or nine hundred degrees more or less, the temperature of control, to create combustion in chamber 46, should not in the preferred construction be more than that normal heat of the exhaust gases. This heat of the exhaust gases will be approximately that of the steam and water in the boiler casing, when combustion is not created in chamber 46, and when there is no delivery of steam from the boiler casing, as may be permitted by hand valve 36. It is to be noted here however that a supplementary circuit closing means by means of hand switch 51 may be provided to start combustion and maintain it if desired, whenever hand valve 36 is open, but this supplementary closing means need not be provided unless great heat supply and steam supply is desired for abnormal operation. It is contemplated that sufficient heat will be supplied for the abnormal operation with the steam supply, at the temperature of the exhaust gases in the boiler casing, if this heat is supplied when necessary. If the supplementary closing means is desired for some constructions then preferably also a maximum heat control should be provided to break the circuit when this maximum heat is exceeded, but this may be observed by the operator and the hand switch 51 opened when necessary. Preferably in constructions where great abnormal power is required, but only a degree or relatively small proportion of sustained abnormal power is required, the control by means of the thermo-regulator providing for heat combustion initiation in chamber 46 whenever the heat is less than the heat of exhaust gases, is sufficient to supply the necessary steam generation, at a sufficient steam pressure. (See Figures 2, 3, 8, 5.)

The combustion chamber 46 (under the conditions stated) receives air and fuel for combustion as delivered by means of a blower 52 and liquid fuel pump 53, both of which are coordinately driven by means of motor armature 54, the blower driven directly and the pump through the medium of the gear 55 and gear wheel 56, the motor having the fields 57. A spark or heating element ignition means 58, is included in the motor circuit as a shunt. The liquid fuel pump 53 delivers through pipe 59 and spray nozzle 59a to the combustion chamber 46 where fuel is mixed with the air from blower 52. (See Figures 2, 3, 8.)

The gear wheel 56 by its shaft 60 also drives coordinately with the blower and fuel pump 53 the water (or other liquid supply) pump 61 so that whenever the air and fuel pump deliver to the combustion chamber 46, this water pump 61 will also deliver to regulator chamber 62 and thence to the boiler supply conduit 63, the non-return valve 64 preventing return to regulator chamber 62. The latter has in it a control piston 65 which is yieldably restrained or returned by spring 66 and may when pressed outwardly by excessive pressure open the regulator chamber 62 to relief water conduit 67 by means of the port 68. This regulation is such that water is maintained in the boiler casing at a pressure which will be approximately as great as or greater than the pressure of steam necessary to maintain a supply of liquid in the boiler casing, as nearly the full capacity of the boiler casing as may be found practicable, so that such a supply of water liquid under the minimum heat of the exhaust gases and ready to burst into steam at the required pressure is maintained. The maintenance of this supply of liquid is aided by the auxiliary water supply pump 69 which is driven through eccentric 70 and eccentric rod 71 by the engine crank shaft 2, this pump delivering to the regulator chamber 62 by means of non-return valve 72. This will always deliver a supply of water at the required pressure during the operation of crank shaft 2 but if the pressure of regulation is exceeded all water delivered by either pump will be by-passed to relief and supply pipe 67 as described.

There has now been described the means of maintenance of water or other liquid and some steam possibly (according to the use) in the boiler casing and the circulation of water as provided in them will provide for heat in the boiler casing. This maintenance of heated liquid or steam in the boiler casing is the means utilized to maintain a steady and uniform and high heat for the maintenance of heat for generation of fuel vapour under high pressure in a fuel vapour generator 73 (see Figures 2, 1, 7, 3) which is a coil coiled within the steam space X of the boiler casing. This generator or coil may deliver to conduits 33 as controlled by hand valve 35, and it receives liquid fuel, as gasoline or alcohol or other liquid fuel of such a refined type and capable of vaporization without carbon deposit or of relatively low carbon deposit or without breaking down into such deposits. It is contemplated that the highly refined fuels available today or in the future will supply such liquid fuel as will withstand the high heat necessary to provide the vapour fuel at high pressure, as provided by the heat of the steam in the space X.

Figure 7:
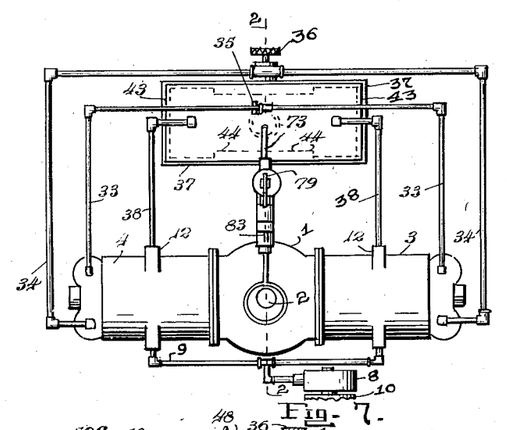
Fig. 7 shows a view looking from the right of Figures 2, 3, and 8.

The liquid fuel supply to fuel vapour generator 73 is by means of a fuel pump 74 driven by eccentric rod 75 and eccentric 76 on crank shaft 2, and this pump has a capacity approximately that of the maximum fuel utilized in the engine cylinders under their maximum operation as internal combustion engine cylinders. This supply is at a high pressure, and may be normally at several hundred pounds, even as much as eight or nine hundred pounds, depending on the construction, and the nature of the fuel used, and the cycle of the engine, whether compression ignition or spark ignition, and this is controlled by a pressure regulator piston 77, pressed by spring 78, which by means of lever 79 may move valve 80 to open by-pass port 81 whenever the pressure predetermined is exceeded so that then liquid fuel is by-passed to by-pass conduit 82 and thence to the liquid fuel supply conduit 83. Non-return valve 84 prevents return of liquid fuel in the generator coil 73. A hand valve 85 provides means for opening another by-pass relief conduit 86, this method of control being alternative to that provided by hand valve 35, to be used if desired, the hand valves thus providing for the operation of the generator coil 73 wholly as a flash type of generator or as a semi-flash type. (Figures 2, 7, 8.)

Figure 5 shows the circuit of control for the initiation of combustion in chamber 46.

There has now been described the method of maintenance of the heat for the fuel vapour supply under pressure and the method of supply of the liquid fuel.

In the operation of my device and use thereof, it is contemplated that the construction will depend somewhat on the use to which it is applied, whether for heavy duty service, as railroad units or trains, busses, automobiles and trucks, or stationary engine use. For a stationary engine use, the steam pressure generator would serve the principal purpose of providing the heat maintenance and medium for the fuel vapour generation at pressure to supply injection, and would serve subordinately only as a means for starting of the engine from a standstill. For automobile use or ordinary vehicle use of the lighter type, the steam pressure generator would serve the primary use or purpose of providing the heat maintenance for fuel vapour generation, and would serve an occasional purpose for the starting of the engine crank shaft as well as for the starting of the vehicle from standstill, for hill climbing and hard pulling, but this use for the steam pressure generator would still be relatively light as the engine would be of the higher speed type and would have relatively high starting or pulling power. For the heavier uses for railroad vehicles or trains, and for busses, the engine would be of a somewhat slower speed type and relatively larger proportion of steam pressure generation for hill climbing and vehicle starting and hard pulling would be required. The greater the use of the steam pressure generator the greater would be the proportion of power generation and it would consequently be made to suit the purpose and use of the power device. The controls would be modified and proportioned for the use.

As it has been described it is designed for the lighter vehicle use and may with some modification and adaptation or in the same form as to controls, be used for either the stationary engine purpose or the heavy vehicle or train duty.

The device is placed in condition for operation by closing of the circuit from the battery through the blower motor and thermostatic control means, and this closing starts the motor and blower and fuel and water pumps associated therewith, and thus combustion is initiated in the combustion chamber 46, and heat supplied to the flues, the gases passing through the flues 40a of the boiler casing and thence backwardly through the flues 40b to the atmospheric outlets. This heats the boiler casing, and the water liquid therein is quickly brought to the high heat as predetermined, and this heat provides the heat for the generation of the fuel vapor pressure in the fuel vapour generator coil and when this condition is attained, which will be in a very short time, the device is ready for starting of the engine, the operator may then open the hand valve 36 whereupon vapour pressure (water vapour or steam) will flow from the boiler casing to the steam pressure valves 21 and thence in cyclic order to the engine cylinders, thus operating the pistons in cyclic order and revolving the engine crank shaft. Thereupon the operator may open hand valve 35 and thereupon fuel vapour under pressure may flow to the fuel vapour valves 20 and thence cyclically and periodically to the engine cylinders at the period of maximum compression or before that time, and combustion with the periodic charges of air from the scavenging blower will occur in each engine cylinder and this combustion in the engine cylinders will provide power for operation. The operator may then use or continue to use the steam pressure delivery by valves 21 to the engine cylinders until the vehicle has gained sufficient speed to be properly operated by the normal combustion alone in the engine cylinders. When this speed has been attained he may then close hand valve 36 to cut off the flow of steam pressure fluid from the boiler casing, but the flow of fuel vapour will continue cyclically to the engine cylinders.

While the engine cylinders operate as internal combustion engine cylinders, heat is constantly being supplied to the boiler casing by the passage of the exhaust gases through the flues 40b. Passage of the exhaust gases through the flues 40a of the boiler casing may also occur if the blower supplying chamber 46 is not operating but this would not interfere with the operation as this exhaust gas would merely pass to atmosphere through the blower supplying chamber 46. (If desired a light non-return valve may be installed in the passage through the blower to prevent this flow.) The blower 52 must when operating deliver sufficient pressure of air to induce passage through the flues 40a to passages 44 to flues 40b. Passage of gases through the flues of the boiler casing will in any event during operation of the engine keep the boiler casing supplied with the necessary heat. If for any reason, as closing of valve 35, this heat flow ceases, or if the drain on the boiler casing by means of valves 21 (when valve 36 is open) exceeds the storage of heat in the water liquid, then the thermo-regulator will close the electric circuit to start the blower and fuel pump to supply chamber 46 and combustion will then initiate in chamber 46. This combustion will cease whenever heat in the boiler casing exceeds the predetermined heat or temperature. When the steam from the boiler casing is used by valves 21 for only brief periods, the storage of heat in the boiler casing in the water will suffice to furnish the necessary steam pressure power for the additional torque necessary or required, and thus economy will be effected in fuel utilization, but when abnormally long periods of steam pressure supply are required as by excessively long hill climbing, the additional heat supply from the combustion chamber 46 may become necessary and will then be automatically initiated. In some cases if greater than normal power is required the operator may close hand switch 51 thus providing excessive heat. It is contemplated that the usually used water and heat gauges may be provided for the operator's information.

By means of the storage of the heat of the engine exhaust gases some economy in the use of fuel for short periods of acceleration and hill climbing is effected and realized, and the amount of this economy is dependent on the use, the relative sizes of the elements of the device, and the nature of the roads over which the vehicle passes.

The injection valves to the engine cylinders are larger than ordinary fuel injection valves for liquid injection, and this larger size which is permitted because of the injection of the fuel as vapour enables more accurate fuel distribution and also enables the same valves to be used for steam pressure distribution, in the manner described. It is to be noted however that other separate steam distribution valves and operating means therefor may be used, that shown being shown as a simple form for use with my device. The pressure in the two generator systems should be regulated as nearly as may be to the same pressure, but preferably the fuel pressure should be the greater. The pressures for which the device is designed would depend on the type of engine used, compression or spark ignition, in the latter case lower pressures being required in both systems, especially where lighter acceleration or starting powers are required. In any starting or acceleration, both systems of combustion may be used, or the starting may be initiated by the steam pressure distribution.

Referring to Fig. 6, the dotted line shows the radius or point of maximum compression in the engine cylinders, or in any one thereof, and with reference to this maximum compression, the period M designates the normal period of fuel vapor injection, the period N designates the period of steam admission to the cylinder if steam be permitted to flow, and the period O designates the period of expansion of the charge whether that be the normal combusting gases, or the combination of combusting gases and steam, or whether it be the steam alone. In the latter case there would also be the additional expansion of the previously compressed normal air charge without however the combustion thereof, since in operation the engine cylinders would continue to receive the normal air charge and compress the same although without combustion, if the flow of fuel vapor from the coil 73 were discontinued.

In operation of the engine, the pressure responsive piston 15 of any cylinder will lift the associated valve 16 from its seat whenever there is sufficient pressure of either fuel vapor or steam to raise it against its spring 29, and this would occur during the period M when the engine operates merely as an internal combustion engine, and would occur during the period MN when the engine operates with its normal gas and air charge and also with the steam admission, and would occur only during the period N when the engine operates only with the steam admission as a working agent.

While I have shown particular detailed devices and combinations of devices in the illustration of my device I contemplate that other detailed devices and combinations of devices may be used in the realization of my device or invention without departing from the spirit and contemplation thereof. The fuel vapour generator means may be used to supply fuel vapour for mixture with air for distribution to cylinders of a four or two cycle engine or the usual mixture type engine.

What I claim is:

1. A fuel vapour generator means embodying a liquid containing heating fluid container, a thermo-regulator means for the heating fluid container responsive to heat therein, a combustion supply means subject to control by the thermo-regulator means for heating the liquid in the heating fluid container, and a fuel container subject to the heat of the heating fluid in the heating fluid container and means for passing a liquid fuel into the fuel container, and fuel vapour therefrom and means for controlling the passage of fuel through the fuel container.

2. A fuel vapour generator means for internal combustion engines embodying a liquid containing heating fluid container, a thermo-regulator means for the heating fluid container responsive to heat therein, combustion supplying means subject to control by the thermo-regulator means for heating the liquid in the heating fluid container, and a fuel container subject to the heat of the heating fluid in the heating fluid container, and means for passing a liquid fuel into the fuel container and fuel vapour therefrom, and means for controlling the passage of fuel through the fuel container.

3. A fuel vapour generator means for internal combustion engines, embodying a liquid containing heating fluid container, a fuel container subject to heat of the heating fluid in the heating fluid container, means for passing liquid fuel into the fuel container and means for passing vapourized fuel from the fuel container to the internal combustion engine for combustion therein in its working cycle, and means for controlling the flow of vaporized fuel from the fuel container to the internal combustion engine and supplementary means for supplying heat to the heating fluid container embodying a thermo-regulator means subject to the heat of the heating fluid in the heating fluid container, and a heat supplying means subject to the control of the thermo-regulator means for supplying heat to the heating fluid container.

4. A fuel vapour generator means for internal combustion engines embodying a liquid containing heating fluid container, means for subjecting the heating fluid container to heat of the exhaust gases of an internal combustion engine, a fuel container subject to heat of the heating fluid in the heating fluid container, means for passing liquid fuel into the fuel container and means for passing vapourized fuel from the fuel container to the internal combustion engine, for combustion therein in its working cycle, and means for controlling the flow of vapourized fuel from the fuel container to the internal combustion engine, and supplementary means for supplying heat to the heating fluid container embodying a thermo-regulator means subject to the heat of the heating fluid in the heating fluid container and a heat supplying means subject to the control of the thermo-regulator means for supplying heat to the heating fluid container.

5. A fuel vapor generator means for internal combustion engines, embodying a water containing heating fluid container, means for subjecting the heating fluid container to heat of the exhaust gases of an internal combustion engine, a fuel container subject to heat of the heating fluid in the heating fluid container, means for passing liquid fuel into the fuel container and means for passing vaporized fuel from the fuel container to the internal combustion engine for combustion therein in its working cycle, and means for controlling the flow of vaporized fuel from the fuel container to the internal combustion engine, and means for supplying water to the heating fluid container and means subject to control for delivering charges of steam from the heating fluid container to the cylinders of the internal combustion engine cyclically during the working strokes of its pistons.

6. A fuel vapor generator means for internal combustion engines, embodying a water containing heating fluid container, means for subjecting the heating fluid container to heat of exhaust gases of an internal combustion engine, a fuel container subject to heat of the heating fluid in the heating fluid container, means for passing liquid fuel into the fuel container and means for passing vaporized fuel from the fuel container to the internal combustion engine for combustion therein in its working cycle and means for controlling the flow of vaporized fuel from the fuel container to the internal combustion engine, and supplementary means supplying heat to the heating fluid container embodying a thermo-regulator means subject to the heat of the heating fluid in the heating fluid container and a heat supply means subject to the control of the thermo-regulator for supplying heat to the heating fluid container, and means for supplying water to the heating fluid container and means subject to control for delivering charges of steam from the heating fluid container to the cylinders of the internal combustion engine cyclically during the working strokes of its pistons.

7. A means for supplying fuel to the cylinders of an internal combustion engine, embodying a means delivering liquid fuel under pressure exceeding atmosphere to a fuel vapor generator, means for heating the fuel vapor generator to vaporize liquid fuel therein, and means for cyclically distributing vaporized fuel under pressure from the fuel vapor generator to the cylinders of the engine and for supplying charges of air to the cylinders to support the combustion therein of the fuel.

8. A means for supplying fuel to the cylinders of an internal combustion engine, embodying a means delivering liquid fuel under pressure exceeding atmosphere to a fuel vapor generator, means for heating the fuel vapor generator to vaporize liquid fuel therein, and means for cyclically distributing vaporized fuel under pressure from the fuel vapor generator to the cylinders of the engine and for supplying charges of air to the cylinders to support combustion of the fuel therein, and means for controlling the supply of heat to the fuel vapor generator.

9. A means for supplying fuel to the cylinders of an internal combustion engine, embodying a means delivering liquid fuel under pressure exceeding atmosphere to a fuel vapor generator, means for heating the fuel vapor generator to vaporize liquid fuel under pressure therein, and means for cyclically distributing and injecting vaporized fuel under pressure from the fuel vapor generator to the cylinders of the engine and for supplying charges of air to the cylinders.

10. A fuel vapor generator for internal combustion engines, embodying a liquid containing heating fluid container, a flue for passing heating gases adjacent the heating fluid container, a combustion chamber discharging to the flue and a blower and fuel supply means to deliver air and fuel to the combustion chamber for combustion therein and thermo-regulator means subject to heat of the heating fluid to control the combustion in the combustion chamber, a fuel vaporizing conduit in the heating fluid container and means passing liquid fuel thereto and means for passing vaporized fuel from the fuel vaporizing conduit to the cylinders of the internal combustion engine, and means for control of the flow of vaporized fuel to the cylinders of the internal combustion engine.

11. A fuel vapor generator means for internal combustion engines, embodying a liquid containing heating fluid container, means for subjecting the heating fluid container to heat of exhaust gases of an internal combustion engine, a fuel container subject to heat of the heating fluid in the heating fluid container, means for passing liquid fuel to the fuel container and means for passing vaporized fuel from the fuel container to the internal combustion engine, for combustion therein in its working cycle, and means for controlling the flow of vaporized fuel from the fuel container to the internal combustion engine, and means for delivering water or vaporizable liquid to the heating fluid container subject to regulation of the delivery according to the pressure in the heating fluid container, and means subject to control for passing steam from the heating fluid container to the cylinders of the internal combustion engine cyclically during working strokes thereof.

12. In a means for supplying the cylinders of an internal combustion engine with two different fluids cyclically and in relation with the movements of working pistons in the cylinders, a port for each cylinder, a valve for each port controlling the port, a pressure responsive actuator for each valve connected with the valve to open and close the valve upon the port in a chamber therefor, yieldable means for each actuator adapted to move the pressure responsive actuator to close the valve upon the port, means supplying a fluid fuel under pressure and means for distributing said fluid fuel cyclically to the pressure responsive actuator chambers to move the actuator to open the valve, means for supplying steam under pressure and means for distributing said steam cyclically during working strokes of the said pistons to each of the pressure responsive actuator chambers to move the actuator to open the valve, each opening of a valve permitting delivery through the associated port to the associated cylinder.

13. An internal combustion engine, a heating fluid container, a fuel container subject to heat of the heating fluid in the heating fluid container, a liquid fuel pump to supply liquid fuel to the fuel container under pressure and means controlling the supply by the pump according to the pressure in the fuel container, and means for delivery of vaporized fuel from the fuel container to the cylinders of the engine for combustion with charges of air therein.

14. An internal combustion engine, a fluid container, means for heating the fluid container and control of the supply of the heat to the fluid container, means driven by the engine for supply of liquid to the fluid container, a supplementary motor and supplementary means driven by the supplementary motor for the supply of liquid to the fluid container, means responsive to the pressure of fluid in the fluid container to limit the supply of liquid to the fluid container by either of the said means, and means for delivering vaporized fluid under pressure from the fluid container to the cylinders of the engine.

15. In an engine, internal combustion engine cylinders and pistons and means supplying to the cylinders cyclically charges of air and fuel for combustion therein in the working cycle of the cylinders, a steam pressure generator and means whereby the exhaust gases of the engine in normal cycle will heat the steam pressure generator, a thermo-regulator means responsive to the temperature of the steam pressure generator and means responsive to the action of said thermo-regulator means to supply combustion of air and fuel to heat the said generator when the temperature of steam generated is less than the normal temperature, and means whereby steam from the said generator may be distributed cyclically to the said cylinders to supply working pressure in the working strokes of said pistons.

16. The means of supplying charges of fuel to cylinders of an internal combustion engine for combustion with charges of air in such cylinders embodying a heating fluid container wherein a liquid is heated to maintain a heating fluid therein at substantially a predetermined temperature, in combination with a fuel container associated with the heating fluid container and subjected to heat of the heating fluid in the heating fluid container, a means for supply of liquid fuel to the fuel container under pressure, a means for distributing to the cylinders of the engine vaporized fuel under pressure from the fuel container, and a control of the quantity of vaporized fuel delivered from the fuel container to the cylinders of the engine.

17. The method of supplying charges of fuel to the cylinders of an internal combustion engine for combustion with charges of air in such cylinders, such method comprising the maintenance of a quantity of liquid in a heating fluid container and maintenance of the fluid in the heating fluid container at substantially a predetermined temperature, the maintenance of a supply of liquid fuel in a fuel container subjected to heat of the heating fluid in the heating fluid container, the heat of the heating fluid producing a pressure of vaporization of the fuel in the fuel container, the distribution of the vaporized fuel under pressure from the fuel container to the cylinders of the engine cyclically and periodically for combustion with the charges of air in the cylinders of the engine.

18. The method of supplying charges of fuel to cylinders of an internal combustion engine for combustion with charges of air in such cylinders, embodying heating a liquid to maintain a heating fluid at substantially a predetermined temperature, supplying a liquid fuel under pressure through a conduit, for heating to vaporization by the heating fluid, cyclically distributing vaporized fuel under pressure as vaporized by the heating fluid to cylinders of the internal combustion engine, and controlling the quantity of fuel delivered to the cylinders of the engine.

19. The method of supplying charges of fuel to the cylinders of an internal combustion engine for combustion with charges of air in such cylinders, such method embodying heating a liquid in a heating fluid container to maintain a heating fluid therein at substantially a predetermined temperature, supplying a liquid under pressure to a fuel container, subjecting the fuel container to heat of the heating fluid to produce vaporization under pressure of the fuel in the fuel container, cyclically distributing vaporized fuel under pressure from the fuel container to the cylinders of the internal combustion engine for combustion with charges of air in the cylinders thereof.

20. An internal combustion engine, a fluid container, means for heating the fluid container by exhaust gases of the internal combustion engine, means driven by the engine for supply of liquid to the fluid container, a supplementary motor and supplementary means driven by the supplementary motor for the supply of liquid to the fluid container and for the supplementary supply of air and fuel for supplementary combustion to heat the fluid container, a thermo-regulator means responsive to the temperature of the fluid in the fluid container and controlling the supply of said liquid and supplementary air and fuel for supplementary combustion, means responsive to the pressure of fluid in the fluid container to limit the supply of liquid to the fluid container by either of said means, and means for delivering vaporized fluid under pressure from the fluid container to the cylinders of the engine.

21. An engine having cylinders and cooperating pistons reciprocable therein and cooperating with a revolvable shaft, a means for supplying the cylinders in cyclical order with charges of air and charges of fuel for combustion in the cylinders in working strokes of the pistons, a fluid container, means for heating the fluid container by exhaust gases of the cylinders, means driven by the engine for supply of water to the fluid container, a supplementary motor and supplementary means driven by the supplementary motor for the supply of water to the fluid container and for the supplementary supply of air and fuel for supplementary combustion to heat the fluid container, a thermo-regulator means subject to heat of the fluid in the fluid container and controlling the supply of said liquid water and supplementary air and fuel for supplementary combustion, means responsive to the pressure of the fluid in the fluid container to limit the supply of water to the fluid container by either of said means, means for cyclically distributing steam from the fluid container to the engine for supplying working pressure in the cylinders, and means for control of the supply of the steam to the engine from said fluid container and the supply of said charges of air and fuel to the cylinders for combustion therein.

22. The means described in claim 15 and in combination a means driven to supply water under pressure to said steam pressure generator and means responsive to the pressure in said steam generator to limit supply of water to said steam generator.

23. A means for supplying fuel to the cylinders of an internal combustion engine, embodying a means delivering liquid fuel under pressure to a fuel vapor generator, a supplementary means for heating the fuel vapor generator to vaporize liquid fuel under pressure therein, a thermo-regulator means subjected to the heat of the vaporized fuel of the said generator, and controlling the heating thereof by said supplementary means, and means for cyclically distributing and injecting vaporized fuel under pressure from the fuel vapor generator to the cylinders of the engine and means for supplying charges of air to the cylinders for compression therein for combustion of the fuel.

24. A means for supplying fuel to the cylinders of an internal combustion engine, embodying a means delivering liquid fuel under pressure to a fuel vapor generator and means subjected to the pressure of fuel in said generator to limit said supply of fuel, means for heating the fuel vapor generator by exhaust gases of the cylinder, a supplementary means for heating the fuel vapor generator to vaporize liquid fuel under pressure therein, a thermo-regulator means subjected to the heat of the vaporized fuel of the said generator and controlling the heating thereof by said supplementary means, and means for cyclically distributing and injecting vaporized fuel under pressure from the fuel vapor generator to the cylinders of the engine and means for supplying charges of air to the cylinders for compression therein for combustion of the fuel.

25. A means for supplying fuel to the cylinders of an internal combustion engine, embodying a fuel pumping means driven by the engine and delivering liquid fuel under pressure to a fuel vapor generator, means for heating the fuel vapor generator by exhaust gases of the cylinder, a supplementary means for heating the fuel vapor generator to vaporize liquid fuel under pressure therein, a thermo-regulator means subjected to the heat of the vaporized fuel of the said generator and controlling the heating thereof by said supplementary means, means for cyclically distributing and injecting vaporized fuel under pressure from the fuel vapor generator to the cylinders of the engine and means for supplying charges of air to the cylinders for compression therein for combustion of the fuel, and a means for control of the quantity of fuel passing through the fuel vapor generator to the engine cylinders.

ADOLPHE C. PETERSON.